United States Patent [19]
McBride

[11] Patent Number: 5,978,744
[45] Date of Patent: *Nov. 2, 1999

[54] INTERPOLATION OF SURVEY COORDINATE DIFFERENCES

[75] Inventor: Kenneth W. McBride, Los Altos, Calif.

[73] Assignee: Trimble Navigation Ltd., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/069,031

[22] Filed: Apr. 27, 1998

[51] Int. Cl.$^6$ ........................................................ G01S 5/02
[52] U.S. Cl. .............................. 702/95; 702/94; 702/150; 33/320; 342/352; 701/207
[58] Field of Search ................................ 702/95, 94, 150; 33/320; 342/357, 352, 463; 701/300, 213, 207

[56] References Cited

U.S. PATENT DOCUMENTS

| | | | |
|---|---|---|---|
| 4,553,164 | 11/1985 | Labb ........................................ | 358/163 |
| 4,903,216 | 2/1990 | Huss et al. ............................... | 364/518 |
| 4,912,565 | 3/1990 | Yokota et al. ........................... | 359/447 |
| 5,048,102 | 9/1991 | Tararine et al. ......................... | 382/41 |
| 5,418,901 | 5/1995 | Omori et al. ............................ | 395/141 |
| 5,513,120 | 4/1996 | Berlad ..................................... | 364/723 |
| 5,570,460 | 10/1996 | Ramanujam ............................ | 395/124 |
| 5,614,913 | 3/1997 | Nichols et al. .......................... | 342/357 |
| 5,717,782 | 2/1998 | Denneau, Jr. ............................ | 382/154 |
| 5,734,348 | 3/1998 | Aoki et al. ............................... | 342/357 |

*Primary Examiner*—John Barlow
*Assistant Examiner*—Hien Vo
*Attorney, Agent, or Firm*—John Schipper

[57] ABSTRACT

A system for improving the accuracy of location coordinate determined in a survey of a chosen region, using a computer. A grid of spaced apart points is imposed on the region, and a set of survey control points is provided. A "near set" of nearest survey control points is associated with each grid point. For each grid point, a transformation T from a first (global) datum and coordinate system to a second (local) datum and coordinate system is determined that minimizes a collective difference between coordinates of each survey control point in the near set and the corresponding coordinates of that survey control point under the transformation T. For one, two or three coordinates of each grid point, a difference $\Delta$ between the coordinate(s) of the grid point in the near set and the corresponding coordinate(s) of that grid point under the transformation T is computed. An interpolation function is determined that approximately matches the coordinate(s) difference $\Delta$ at each grid point. The interpolation function provides a continuous datum-to-datum mapping between all points of the first and the second coordinate systems. Determination of location of each survey point may use GPS, GLONASS, modified LEO, LORAN or any other suitable location determination system.

25 Claims, 4 Drawing Sheets

INTERPOLATION OF SURVEY COORDINATE DIFFERENCES

FIELD OF THE INVENTION

This invention relates to determination of differences between ellipsoids associated with different datums in surveying activities.

BACKGROUND OF THE INVENTION

A survey of locations at a survey site may involve use of location coordinates from previously-surveyed locations ("control survey points"), such as recognizable landmarks and other survey monuments, together with generation of location coordinates for newly-surveyed locations. Even where location coordinates for only newly-surveyed locations are used, these coordinates may not be fully consistent with each other when corrections are made for any errors introduced by use of a local coordinate system. The location coordinates of these locations, representing newly-surveyed locations and/or previously-surveyed locations, must be made consistent with each other in some "best fit" sense.

Survey of a chosen region often requires use of a globally defined survey ellipsoid, such as the NAD27, NAD83 or WGS84 ellipsoid, and of a locally defined ellipsoid that takes account of the local terrain. A globally defined survey ellipsoid is intended to provide a best fit, in some quantitative sense, to the terrain for the entire Earth. A locally defined ellipsoid, by contrast, is only intended to provide a best fit for a locally defined region and thus may provide a better fit over this limited region.

In a survey of a local region, location coordinates may first be obtained using a first, globally defined datum C1, after which these coordinates are re-expressed in terms of a second datum C2, which may be globally defined or locally defined, using a coordinate transformation T. Accurate coordinates for a plurality of survey control points are often available, and these survey control point coordinates are often used to "anchor" the transformation of location coordinates for other survey points. Coordinate differences between a point $p(x,y,z)$ in the first, globally defined datum C1 and the corresponding point $p'(x',y',z')$ in the second datum C2 are presently determined, using a point-by-point approach in which the group of survey control points chosen for "anchoring" can vary with the local terrain. FIG. 1 illustrates a vector difference $\Delta r = (x'—x, y'—y, z'—z)$ between point coordinates $(x,y,z)$ on a surface S1, defined using the datum C1, and the corresponding point coordinates $(x',y',z')$ on a corresponding surface S2, defined using the datum C2. In the past, these coordinate differences were determined point-by-point on each of a plurality of sub-regions or patches that together make up a survey region SR, and these differences were often not continuous or consistent in moving from one sub-region to a contiguous sub-region. Thus, the coordinate differences had to be recomputed by applying the transformation T to each new point in the first datum; and parameters defining the transformation T might change in moving from one sub-region to a contiguous sub-region.

Several workers have considered the problems of representation of locations on a map or chart display and/or adjustment of location coordinates. Previous workers in this field often assume that the coordinates for locations of interest in a coordinate system, or in two or more associated coordinate systems, are consistent with each other. Further, the computations and coordinate manipulations are usually performed in a post-processing environment, rather than in a real time environment in the field at the time the survey measurements are made.

What is needed is an approach that allows real time processing, or post processing, to determine and apply a survey coordinate transformation between the first datum and the second datum in a chosen region that varies continuously and consistently with the point chosen in the region. Preferably, this transformation should be optimal in some sense over a grid of survey control points, and the transformation should depend only minimally or not at all on the particular grid chosen for such optimization. Preferably, this approach should allow use of any of a variety of generally defined coordinate transformations, each with its own set of transformation parameters that are to be optimized based on the survey control constraints imposed.

SUMMARY OF THE INVENTION

These needs are met by the invention, which provides a system for determination and application of a transformation, between a first, globally defined datum and a second datum over a chosen region, that varies continuously with the (arbitrary) choice of survey points within the region. A region is chosen, and a finite number N ($N \geq 2$) of survey control points is identified within the region. A two-dimensional grid is defined over the region in the first datum; and for each point $p=P_G$ on the grid a transformation T, from first datum to second datum and having one or more adjustable parameters, is determined that is optimal, in the sense that the coordinate difference between first datum and second datum is "as close as possible" to the accurately known difference for each of K selected survey control points that is "closest to" the chosen grid point, where $K \leq N$. Each chosen grid point PG may have a different optimal transformation T associated with the grid point.

Three coordinate differences (one for each of latitude, longitude and height), computed using the transformation T at the chosen grid point $P_G$, are associated with each grid point, thus forming three grids of difference values. For these three grids of difference values, a continuously variable interpolation function is determined that (1) substantially matches coordinate difference values (first datum versus second datum) at each grid point, either exactly or as closely as possible in some least qth power sense, and (2) extends each difference value grid to survey points that are not part of the original grid of points.

The transformation T between the first datum and the second datum may be one of the well-known four-parameter, six-parameter, seven-parameter or 12-parameter transformations used in survey work, as discussed in U.S. Pat. No. 5,614,913, issued to Nichols et al and incorporated by reference herein. Alternatively, the transformation T may be any other suitable adjustable parameter transformation between the two datums.

All these determinations of transformations and interpolation mappings between corresponding survey locations in a first datum and in a second datum can be made in the field in near-real time, or these determinations can be made by post-processing after the survey crew returns to the office. The invention will be most useful for in-the-field determinations, where errors in measurement, or in assumptions concerning a local coordinate system used for such measurements, can be promptly corrected if necessary.

DESCRIPTION OF BEST MODES OF THE INVENTION

Figure 1:
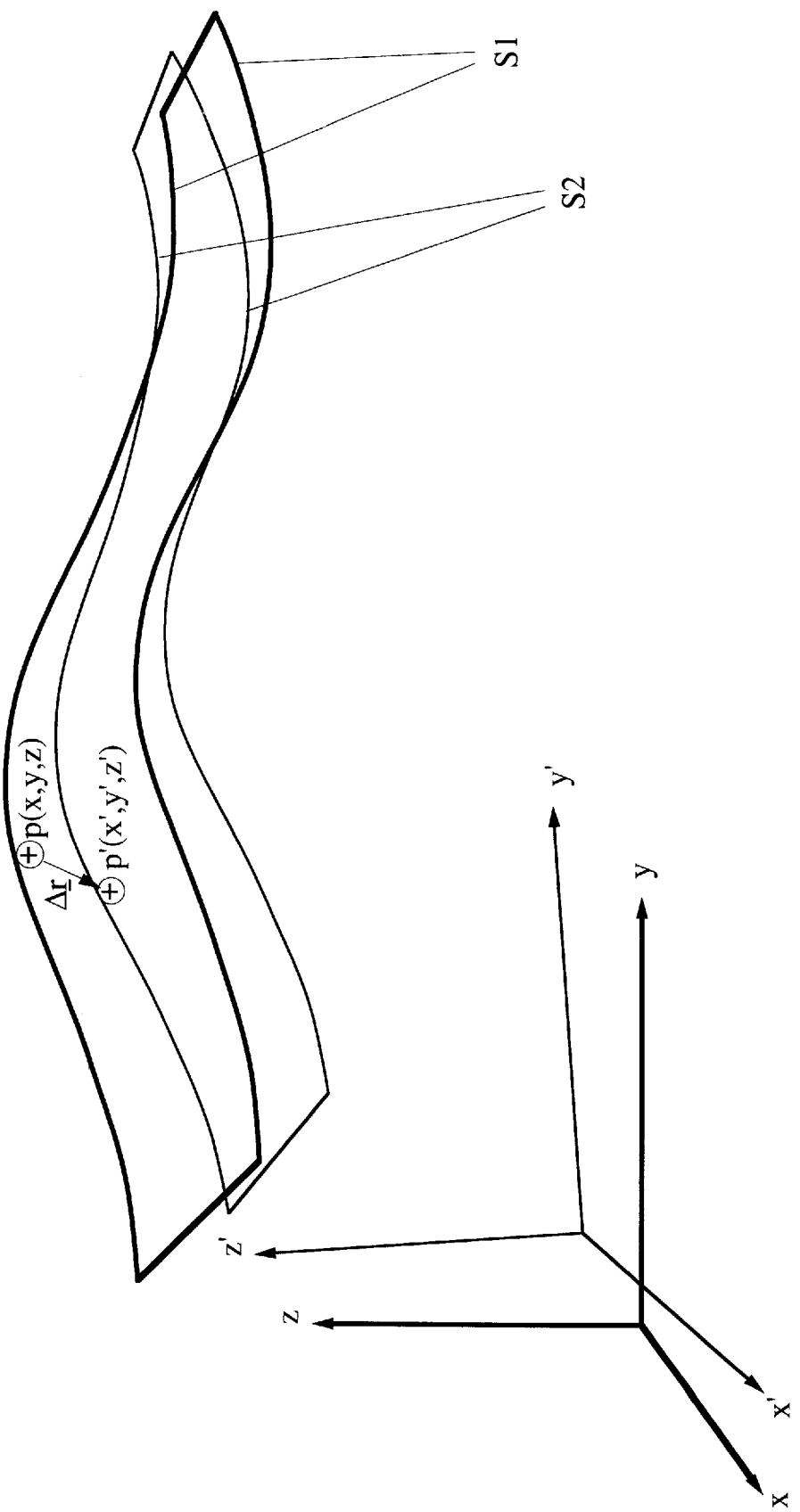
FIG. 1 illustrates coordinate differences between first and second datums.
Figure 2:
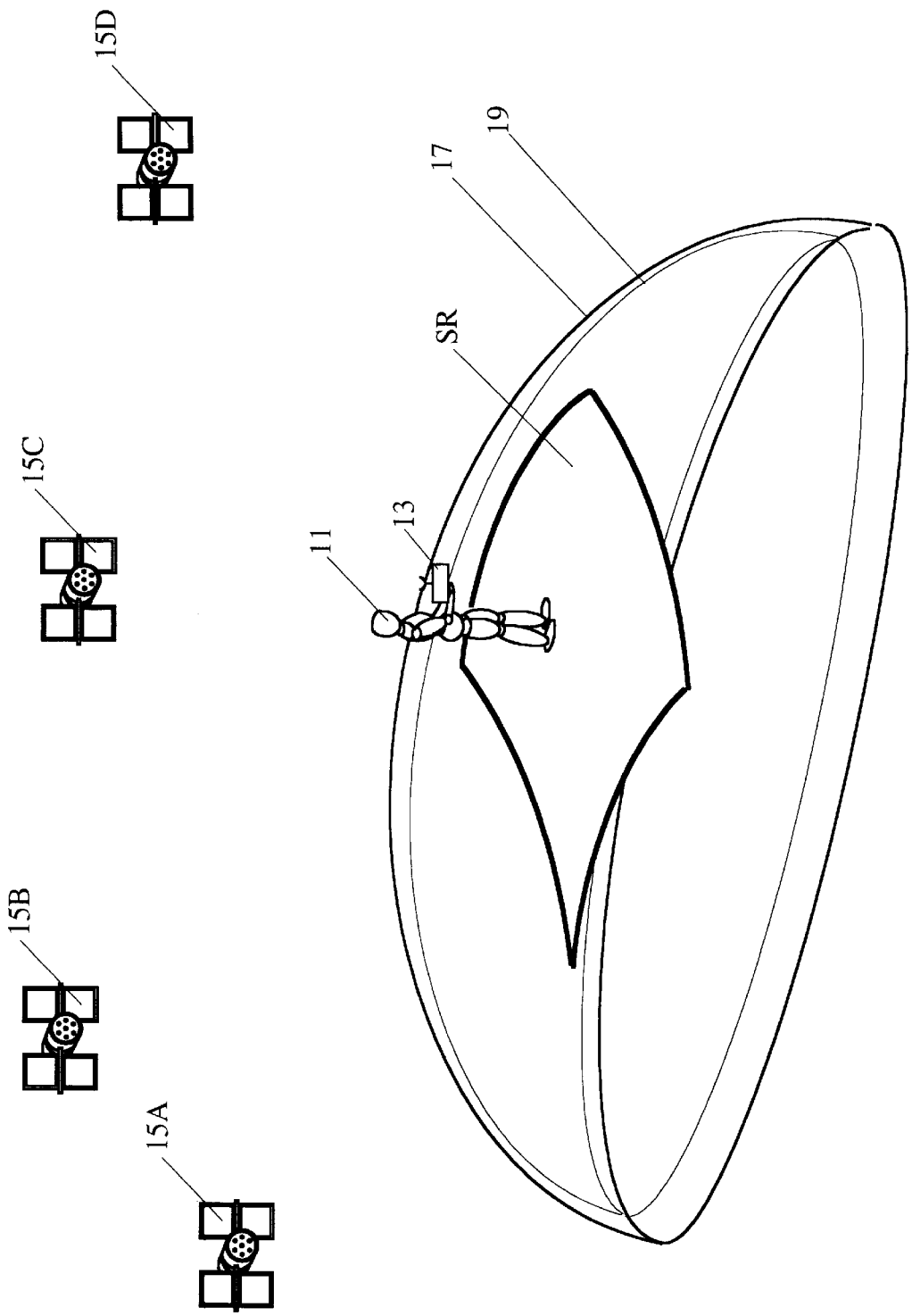
FIG. 2 illustrates application of the invention in one embodiment.

FIG. 1 (not drawn to scale) illustrates use of the invention in one environment. A user 11 employs survey apparatus 13 to conduct a survey at selected points in a chosen survey region SR. The survey apparatus preferably uses timed location determination (LD) signals received from a plurality of LD signal sources 15A, 15B, 15C, 15D, which may be part of a Global Positioning System (GPS), a Global Orbiting Navigational Satellite System (GLONASS), a modified low earth orbit (LEO) system, a Loran system or any other suitable LD system. However, the user apparatus 13 may also be conventional manual surveying apparatus (transit, survey pole, etc.), if desired. The survey is performed using a first, globally defined datum and associated first (global) ellipsoid 17 (and associated coordinate system C1) that is chosen as a best fit to the entire Earth's surface. The survey location coordinates are then to be transformed to a second datum (global or local) and associated second ellipsoid 19 (and associated coordinate system C2) that either (1) provides a better fit to at least part of the chosen region than does the first ellipsoid or (2) is more convenient for reporting the survey results. The survey location coordinates, referred to the first datum and referred to the second datum, will generally not coincide so that coordinate first datum-to-second datum differences are usually extant.

The survey region SR preferably includes N survey control points $P_{SC-n}$ (n=1, 2, ..., N; N≥3) (shown in FIG. 3) whose location coordinates $(x_{SC-n}, y_{SC-n}, z_{SC-n})$ are accurately known for each datum, from performance of one or more previous surveys. The survey control point coordinates are often used to "anchor" or evaluate the accuracy of the transformation between the first datum and the second datum in terms of the accuracy of the transformation at each survey control point.

Figure 3:
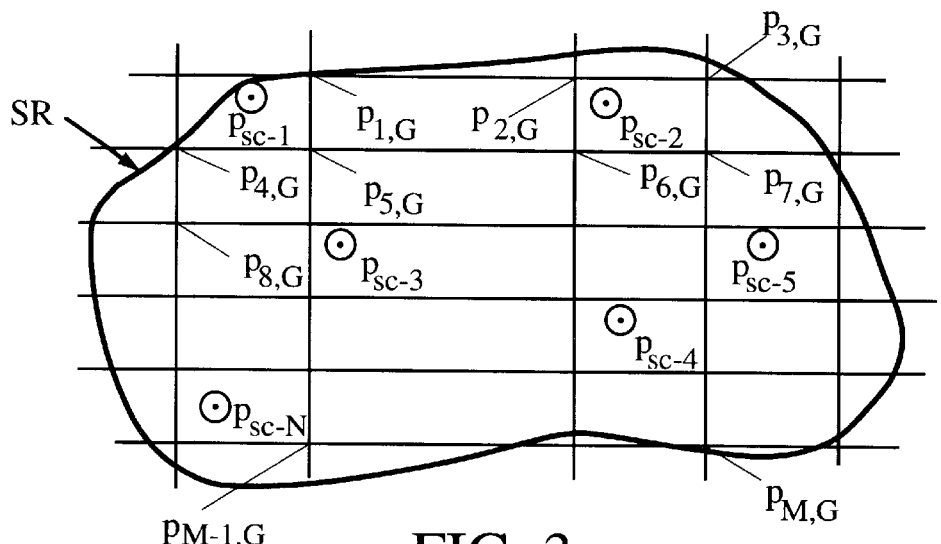
FIG. 3 illustrates a regional grid applied to a survey region.

A grid G of spaced apart points $P_{m,G}$, with corresponding location coordinates $(x_{m,G}, y_{m,G}, z_{m,G})$ (m=1, 2, ..., M), is imposed on the survey region SR in the first datum, as illustrated in FIG. 3. For a selected positive integer K (K≤N), which may but need not vary with the choice of grid point $P_{m,G}$, a set $NSC_m$ of K selected survey control points $p'_{SC-k}$ (k=1, 2, ..., K) that are nearest or closest to the grid point $p_{m,G}$ is identified for each point on the grid G. Two nearest survey control sets, $NSC_{m1}$ and $NSC_{m2}$, may contain different points drawn from the survey control point set, based on the locations of the corresponding grid points $p_{m1,G}$ and $P_{m2,G}$ relative to the survey control points. For example, if K=3, the two sets $NSC_6$ and $NSC_8$ for the grid points $p_{6,G}$ and $p_{8,G}$ in FIG. 3 contain the survey control points $\{p_{SC-1}, p_{SC-2}, p_{SC-3}\}$ and $\{p_{SC-1}, p_{SC-3}, p_{SC-N}\}$, respectively.

The criterion used for "closeness" between a grid point $p_{m,G}$ and a survey control point $p_{SC-n}$ may be the conventional Euclidean distance $$d(p_{m,G}, p_{SC-n}) = \{(x_{m,G} - x_{SC-n})^2 + (y_{m,G} - y_{SC-n})^2 + (z_{m,G} - z_{SC-n})^2\}^{1/2}. \quad (1)$$

More generally, closeness may be defined as a qth power distance, such as $$d(p_{m,G}, p_{SC-n}; q) = \{c_x \mid x_{m,G} - x_{SC-n} \mid^q + c_y \mid y_{m,G} - y_{SC-n} \mid^q + c_z \mid z_{m,G} - z_{SC-n} \mid^q\}^{1/q}, \quad (2)$$

where the coefficients $c_x$, $c_y$ and $c_z$ are selected non-negative real numbers, not all zero, and q is a selected positive number. With the choices q=2 and $c_x = c_y = c_z = 1$, the conventional Euclidean distance is recovered.

For each nearest control survey point set $NSC_m$, corresponding to a grid point $p_{m,G}$, a transformation $T[p;p_{m,G}]$ of location coordinates of a point p in the first datum into location coordinates in the second datum is determined that minimizes a generalized distance between the coordinates of each survey control point $p'_{SC-k}$ in the set $NSC_m$ and the image under the transformation T of the survey control point $p'_{SC-k}$, summed over all survey control points in the set $NSC_m$. This generalized distance between $NSC_m$ and its image under T may be defined, for example, as a sum, $$d\{NSC_m, T[NSC_m]\} = \sum_{k=1}^{K} \{d(p'_{SC-k}, T[p'_{SC-k}; p_{m,G}]; r)\}^r, \quad (3)$$

where the individual quantities $d(p'_{SC-k}, T[p'_{SC-k}; p_{m,G}]; r)$ are defined in Eq. (1) or Eq. (2), for a particular choice of the positive exponent r, which need not coincide with the choice of the exponent q in Eq. (2).

The transformation $T[p;p_{m,G}]$ may, for example, be any of the four-parameter, six-parameter, seven-parameter or 12-parameter coordinate transformations discussed in U.S. Pat. No. 5,614,913, incorporated by reference herein. Alternatively, the transformation $T[p;p_{m,G}]$ may be any other suitable transformation of location coordinates.

A general form of linear transformation T on a three-dimensional coordinate system is one which carries Cartesian coordinates (x,y,z) in the first system into coordinates (x',y',z') in the second system, where the two sets of coordinates are related by $$\begin{bmatrix} x' \\ y' \\ z' \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ z \end{bmatrix} + \begin{bmatrix} h_{14} \\ h_{24} \\ h_{34} \end{bmatrix} \quad (4)$$

and where at least one of the coefficients $h_{ij}$ (i=1,2,3; j=1,2,3,4) is an adjustable parameter. In the most general transformation T of this sort, all 12 of the coefficients $h_{ij}$ are independently adjustable. In a well known special transformation, due to Molodensky, only seven parameters are independently adjustable, and the transformation T is expressed in the form $$\begin{bmatrix} x' \\ y' \\ z' \end{bmatrix} = L \begin{bmatrix} \cos\theta 12 & \sin\theta 12 & 0 \\ -\sin\theta 12 & \cos\theta 12 & 0 \\ 0 & 0 & 1 \end{bmatrix} \begin{bmatrix} \cos\theta 13 & 0 & -\sin\theta 13 \\ 0 & 1 & 0 \\ \sin\theta 13 & 0 & \cos\theta 13 \end{bmatrix} \times \begin{bmatrix} 1 & 0 & 0 \\ 0 & \cos\theta 23 & \sin\theta 23 \\ 0 & -\sin\theta 23 & \cos\theta 23 \end{bmatrix} \begin{bmatrix} x \\ y \\ z \end{bmatrix} + \begin{bmatrix} \Delta x \\ \Delta y \\ \Delta z \end{bmatrix}, \qquad (5)$$

where L is a selected nonzero overall scale factor, θ12, θ13 and θ23 are selected angles of rotation about the third, second and first rectangular coordinates axes (or other selected axes), respectively, and Δx, Δy, and Δz are selected translation distances parallel to the three coordinates axes. Any other suitable three-dimensional transformation can also be used here.

A general form of linear transformation T on a two-dimensional coordinate system is one which carries Cartesian coordinates (x,y) in the first system into coordinates (x',y') in the second system, where the two sets of coordinates are related by $$\begin{bmatrix} x' \\ y' \end{bmatrix} = \begin{bmatrix} h_{11} & h_{12} \\ h_{21} & h_{22} \end{bmatrix} \begin{bmatrix} x \\ y \end{bmatrix} + \begin{bmatrix} h_{14} \\ h_{24} \end{bmatrix}, \qquad (6)$$

and where at least one of the coefficients $h_{ij}$ (i=1, 2; j=1, 2, 4) is an adjustable parameter. In the most general transformation T of this sort, all six of the coefficients $h_{ij}$ are independently adjustable. A special transformation of interest is given by $$\begin{bmatrix} x' \\ y' \end{bmatrix} = L \begin{bmatrix} \cos\theta & \sin\theta \\ -\sin\theta & \cos\theta \end{bmatrix} \begin{bmatrix} x \\ y \end{bmatrix} + \begin{bmatrix} \Delta x \\ \Delta y \end{bmatrix}, \qquad (7)$$

where L is a selected nonzero overall scale factor, θ is a selected rotation angle about a selected axis, and Δx and Δy are selected translation distances parallel to the two coordinate axes. Any other suitable two-dimensional transformation can also be used here.

The transformation $T[p;p_{m,G}]$ is now applied to the grid point $p_{m,G}$ ($p=p_{m,G}$), and coordinate differences $$\Delta(x_{m,G}) = d(x_{m,G}, T[p_{m,G}; p_{m,G}]_x; s) \qquad (8)$$

$$\Delta(y_{m,G}) = d(y_{m,G}, T[p_{m,G}; p_{m,G}]_y; s) \qquad (9)$$

$$\Delta(z_{m,G}) = d(z_{m,G}, T[p_{m,G}; p_{m,G}]_z; s) \qquad (10)$$

are computed for each grid point $p_{m,G}$, where $T[p_{m,G}]_w$ (w=x, y, z) indicates the value of the corresponding coordinate w under the transformation $T[p;p_{m,G}]$ applied to the grid point $P_{m,G}$. Here, s is another positive exponent that may, but need not, coincide with either of the exponents q and r. Recall that each grid point $P_{m,G}$ may have a different associated transformation $T[p;p_{m,G}]$, or may have the same transformation form but with different transform parameters, or may have the same transformation.

A difference interpolation function IF(x,y,z) is now defined on one or more of the location coordinates $x_{m,G}$, $y_{m,G}$ and/or $z_{m,G}$ (m=1, 2, . . . , M) of the grid points that provides a best fit to the function value(s) Δ($x_{m,G}$), Δ($y_{m,G}$) and/or Δ($z_{m,G}$). The interpolation function IF is then extended to all coordinate values in the survey region SR and provides an estimate of the first datum-to-second datum coordinate differences that is continuous over the survey region SR.

Figure 4:
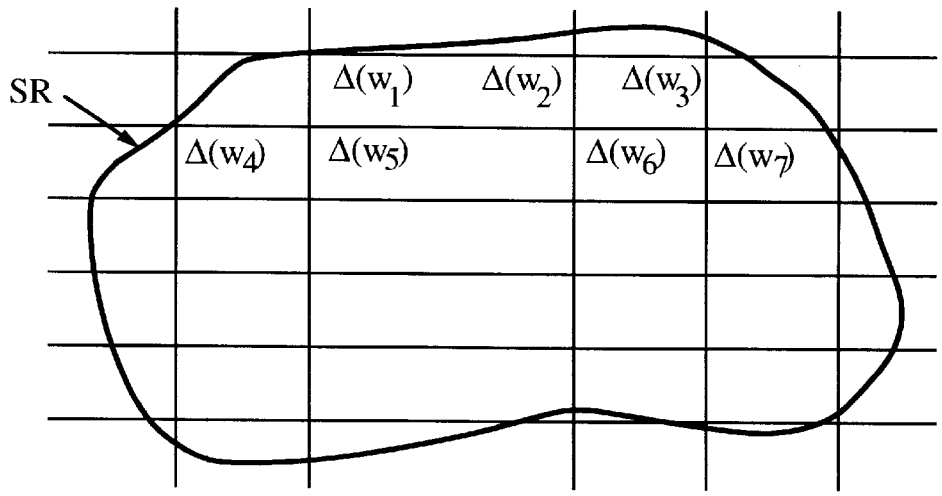
FIG. 4 illustrates a grid of transformation differences between first and second datum coordinates, constructed according to the invention, to a plurality of coordinate grids, corresponding to the regional grid in FIG. 2.

The original grid G may be re-expressed as first, second and third coordinate grids, one of which is illustrated in FIG. 4 with w=x, y or z, corresponding to the respective x-, y- or z-coordinate values of the individual grid points $P_{m,G}$. A separate difference interpolation function IF is optionally defined on each of the grids, corresponding to w=x, y and z. Alternatively, the same form for the interpolation function IF, with different parameters corresponding to each of the grids for w=x, y and z, can be used here.

Where a set of two-dimensional difference numbers d($x_i$, $y_i$) (i=1, 2, . . . , M) is to be approximated or interpolated by a function IF(x,y), exact and approximate approaches are available to determine a suitable function f. The quantities d($x_i$,$y_i$) may be the differences d($p'_{SC-k}$,T[$p'_{SC-k}$;$p_{m,G}$];s) between the coordinates of each survey control point $p'_{SC-k}$ in the set $NSC_m$ and the image under the transformation T[p;$p_{m,G}$] of the survey control point $p'_{SC-k}$, as developed in the preceding. If the individual coordinates in the coordinate constraint set CS={$x_i$,$y_i$} satisfy $$x_i \neq x_j \ (i \neq j), \qquad (11)$$

$$y_i \neq y_j \ (i \neq j), \qquad (12)$$

the multilinear function $$IF(x, y) = \sum_{i=1}^{M} d(x_i, y_i) \prod_{\substack{j=1 \\ j \neq i}}^{M} \{(x - x_j)(y - y_j) / ((x_i - x_j)(y_i - y_j))\} \qquad (13)$$

satisfies $$IF(x=x_i, y=y_i) = d(x_i, y_i) \qquad (14)$$

for each value in the coordinate constraint set. If the inequalities (11) and (12) are not all satisfied, the multilinear function in Eq. (13) is modified to $$IF'(x, y) = \sum_{i=1}^{M} d(x_i, y_i) \prod_{\substack{j=1 \\ \{j \neq i, x_j \neq x_i, y_j \neq y_i\}}}^{M} \{(x - x_j)(y - y_j) / ((x_i - x_j)(y_i - y_j))\}, \qquad (15)$$

where the avoidance requirements {j≠i, $x_j \neq x_i$, $y_j \neq y_i$} for the product Π are interpreted as follows. Where two x-coordinate values $x_i$ and $x_j$ in the constraint set CS satisfy $x_i = x_j$ with i≠j, the ratio (x−$x_j$)/($x_i$−$x_j$) is formally removed (absent) from the product Π. Similarly, where two y-coordinate values $y_i$ and $y_j$ in the constraint set CS satisfy $y_i = y_j$ with i≠j, the ratio (y−$y_j$)/($y_i$−$y_j$) is formally removed (absent) from the product Π, and similarly for the ration ((x−$x_j$)/($x_i$−$x_j$) with $x_i = x_j$ and $x_i \neq x_j$). This insures that no factor in the denominator in the product Π is identically zero. In practice, if two x-coordinate values $x_i$ and $x_j$ (or two y-coordinate values $y_i$ and $y_j$) in the constraint set CS are not identical but are sufficiently close (e.g., within a few centimeters or decimeters of each other), the ratio $(x-x_j)/(x_i-x_j)$ (or $(y-y_j)/(y_i-y_j)$) is preferably formally removed from the product $\Pi$.

A three-dimensional multilinear function, corresponding to the function IF'(x,y) in Eq. (15) may be defined by $$IF''(x,y,z)$$

$$IF''(x, y, z) = \sum_{i=1}^{M} d(x_i, y_i, z_i) \prod_{\substack{j=1 \\ \{j \neq i, x_j \neq x_i, y_j \neq y_i, z_j \neq z_i\}}}^{M} \{(x - x_j)(y - y_j)(z - z_j)/ \\ ((x_i - x_j)(y_i - y_j)(z_i - z_j))\}, \quad (16)$$

with an interpretation of the additional deleted terms ($z_j \neq z_i$) in the product $\Pi$ that is analogous to the interpretation of deleted terms for the multilinear function IF'(x,y) in Eq. (15).

The multilinear functions IF'(x,y) and IF''(x,y,z) defined in Eqs. (15) and (16) may be polynomials of degree up to M-1 in x and up to degree M-1 in y (and up to degree M-1 in z). If this polynomial degree is too large for the memory available, or for other reasons, the multilinear function IF'(x,y) or IF''(x,y,z) in Eq. (15) or Eq. (16) may be replaced by a lower degree polynomial, such as $$IG''(x, y, z) = \sum_{k=0}^{M_x} \sum_{l=0}^{M_y} \sum_{m=0}^{M_z} g_{k,l,m} x^k y^l z^m, \quad (17)$$

where $M_x$, $M_y$ and $M_z$ are suitably chosen non-negative integers. The coefficients $g_{k,l,m}$ in Eq. (17) may be determined by requiring a least squares fit for the coordinate pairs $(x_i, y_i, z_i)$ in the constraint set CS. That is, these coefficients are chosen so that a mean square error term $$\varepsilon(g_{k,l,m}) = \sum_{i=1}^{K} \sum_{k=0}^{M_x} \sum_{l=0}^{M_y} \sum_{m=0}^{M_z} \{g_{k,l,m}(x_j)^k (y_j)^l (z_j)^m \quad (18)$$

is minimized. This requires that the coefficients $g_{k,l}$ satisfy the relations $$\partial \varepsilon / \partial g_{k,l,m} = 2 \sum_{i=1}^{K} \sum_{k=0}^{M_x} \sum_{l=0}^{M_y} \sum_{m=0}^{M_z} \{g_{k,l,m}(x_j)^k (y_j)^l (z_j)^m \quad (19)$$

from which the coefficients $g_{k,l,m}$ can be determined by standard linear algebra techniques.

If interpolation is desired only over a two-dimensional region or surface, a suitable analogue of the polynomial IG''(x,y,z) in Eq. (17) is $$IG'(x, y, z) = \sum_{k=0}^{M_x} \sum_{l=0}^{M_y} g_{k,l,m} x^k y^l, \quad (20)$$

and the analogue of the minimization relation, Eq. (19), becomes $$\sum_{i=1}^{K} \sum_{k=0}^{M_x} \sum_{l=0}^{M_y} \sum_{m=0}^{M_z} \{g_{k,l}(x_j)^k (y_j)^l - d(x_i, y_i)\}(x_j)^k (y_j)^l = 0. \quad (21)$$

Another suitable interpolation function, defined on a two-dimensional surface, is a "bilinear" interpolation function IB(x,y;i,j) that is defined on each grid "rectangle" $\{x_i \leq x \leq x_{i+1}, y_j \leq x \leq y_{j+1}\}$ as $$IB(x,y;i,j) = a_{i,j} xy + b_{i,j} x + c_{i,j} y + d_{i,j}, \quad (22)$$

where the coefficients $a_{i,j}$, $b_{i,j}$, $c_{i,j}$, and $d_{i,j}$, are chosen so that $$IB(x=x_p, y=y_q; i,j) = d(x_p, y_q) \quad (p=i \text{ or } i+1; q=j \text{ or } j+1). \quad (23)$$

The coefficients $a_{i,j}$, etc. are found by standard linear algebra techniques, using Eqs. (22) and (23). By matching the values at each corner of a rectangle, using a bilinear function, one insures that two bilinear functions, defined on contiguous grid rectangles, will substantially agree on the boundary line that the rectangles share.

Another suitable interpolation function, defined on a two-dimensional surface, is a "bicubic" interpolation function IC(x,y;i,j) that is defined on each grid "rectangle" $\{x_i \leq x \leq x_{i+2}, y_j \leq x \leq y_{j+2}\}$ as $$IC(x, y; i, j) = a_{i,j} x^3 + b_{i,j} x^2 y + c_{i,j} xy^2 + d_{i,j} y^3 + e_{i,j} x^2 + f_{i,j} xy + g_{i,j} y^2 + h_{i,j} x + k_{i,j}, \quad (24)$$

where the coefficients $a_{i,j}, \ldots, k_{i,j}$ are chosen so that $$IC(x=x_p, y=y_q; i; j) = d(x_p, y_q) \quad (p=i, i+1, i+2; q=j, j+1, j+2). \quad (25)$$

The coefficients $a_{i,j}$, etc. are found by standard linear algebra techniques, using Eqs. (24) and (25).

Another suitable method uses spline functions, such as a cubic spline, extended to two- or three-dimensional coordinates. Spline methods are discussed by M. J. D. Powell, *Approximation theory and methods*, Cambridge University Press, 1981, pp. 212–240, 261–265, 277–295. Any other suitable interpolation function can also be used here.

Each of the interpolation functions provides an interpolation function discussed or mentioned on the preceding for the differences $d(p'_{SC-k}, T[p'_{SC-k}; p_{m,G}]; r)$, extended to all points in the survey region SR. Other interpolation functions can also be defined and used here.

Figure 5:
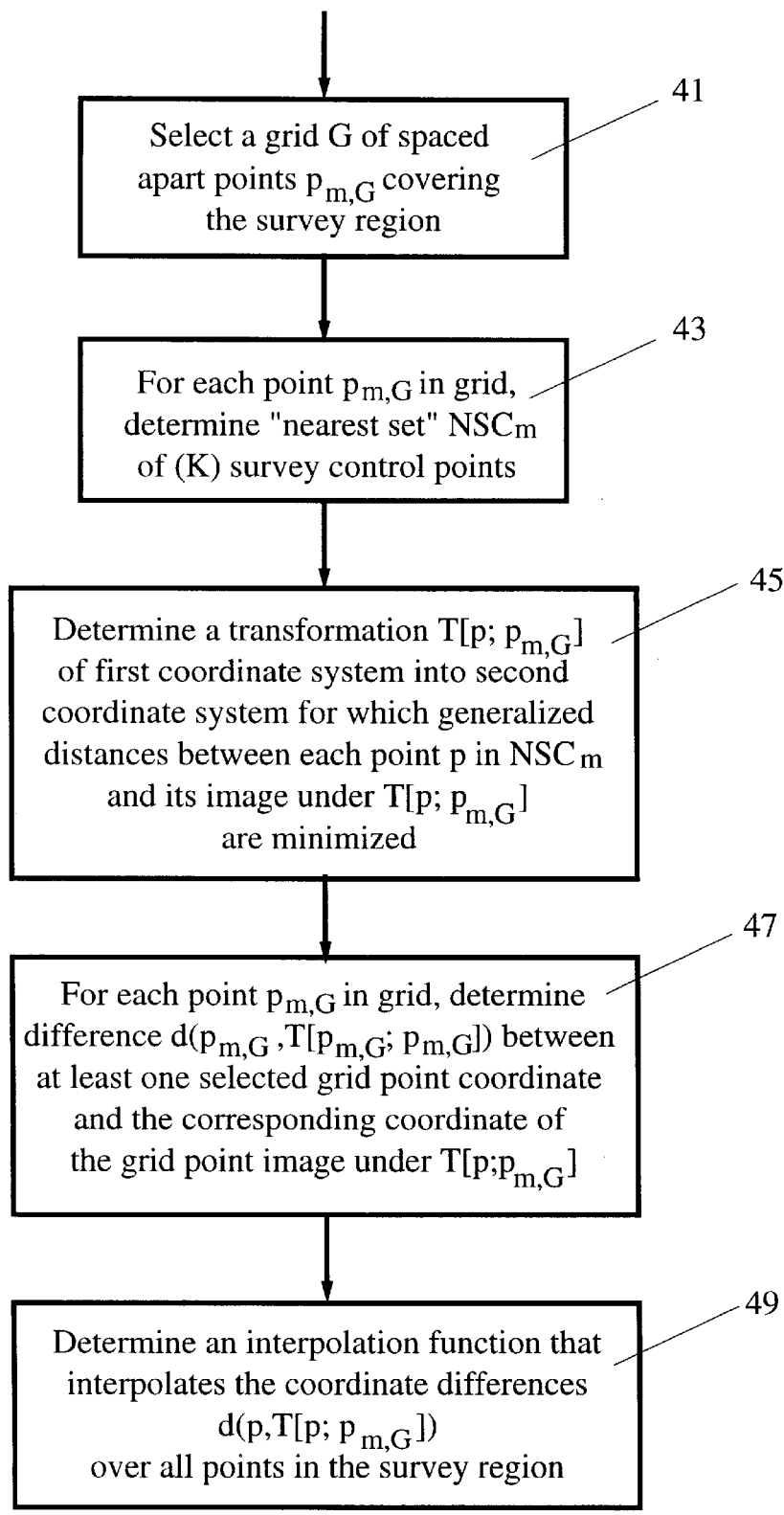
FIG. 5 is a flow chart illustrating a method for practicing the invention.

FIG. 5 is a flow chart illustrating one method for practicing the invention. In step 41, the system selects or imposes a grid G of spaced apart points $P_{m,G}$ (m=1, 2, ..., M) on the survey region SR. In step 43, for each grid point $P_{m,G}$, a "nearest set" $NSC_m$ of (K) survey control points, from among all survey control points, is determined.

In step 45, a transformation $T[p; p_{m,G}]$, depending upon the particular grid point $P_{m,G}$ selected, is determined, mapping a first coordinate system onto a second coordinate system, that (optionally) minimizes the generalized differences between the survey control points in $NSC_m$ and their images under the transformation $T[p; p_{m,G}]$. In step 47, for each grid point $P_{m,G}$, a difference $d(p_{m,G}, T[p_{m,G}; p_{m,G}])$ is determined between at least one location coordinate of $P_{m,G}$ and the corresponding location coordinate of the image under the transformation $T[p; p_{m,G}]$. In step 49, an interpolation function IF'(x,y) (or IF''(x,y,z)) is determined that interpolates coordinate differences $d(p, T[p; p_{m,G}])$ over all points p in the survey region.

The interpolation function, IF'(x,y) or IF''(x,y,z) or IG'(x, y) or IG''(x,y,z) or IB(x,y;i,j) or IC(x,y;i,j) or other, is continuous in the coordinates x and y (and z) and is employed to approximate the actual distances between any point in the survey region in the first coordinate system and the corresponding point in the second coordinate system. The interpolation function thus obtained can be used to provide continuous and consistent interpolation values for the coordinate differences $\Delta r=(\Delta x,\Delta y,\Delta z)$ between the first and second datums in a survey project.

Figure 6:
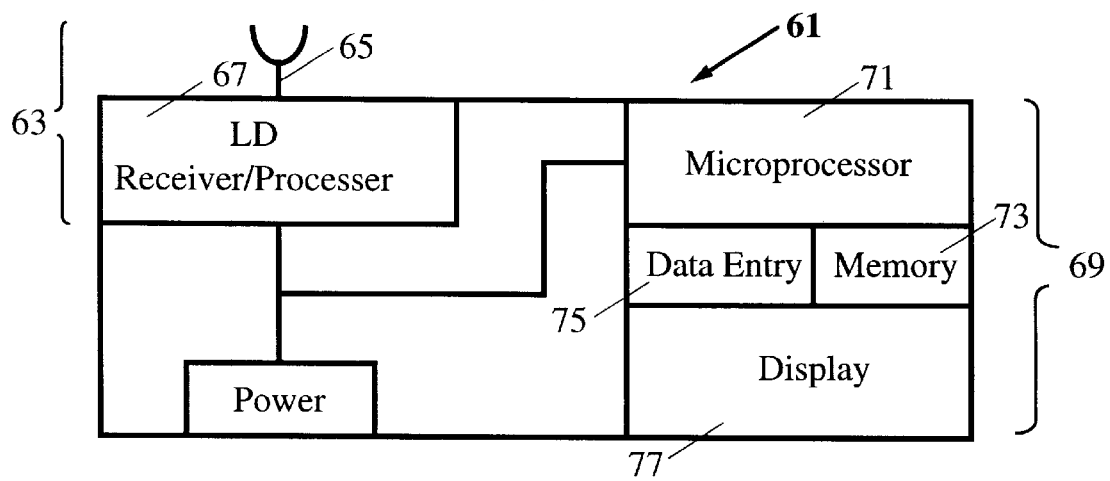
FIG. 6 illustrates apparatus suitable for practicing the invention.

FIG. 6 illustrates apparatus 61 suitable for practicing the invention. The apparatus 61 includes an LD module 63, including and LD signal antenna 65 and LD signal receiver/processor 67 that receive and process LD signals and determine the present location coordinates of the LD module 63. At a sequence of selected times, the present location coordinates are presented to a computer 69 that includes a microprocessor 71 and a memory unit 73 containing coordinates for one or more survey control points. Optionally, the LD signal receiver/processor 67 and the microprocessor 71 are part of the same data processing unit. The microprocessor 71 is programmed: (1) to obtain a coordinate grid $\{P_{m,G}\}$ for the survey region; (2) to obtain a coordinate transformation $T[p;p_{m,G}]$ in the first datum between the first and second datums, using the survey control point(s) coordinates as discussed above; (3) to determine one, two or three coordinate differences $d(p_{m,G},T[p_{m,G};p_{m,G}])$ between the first and second datums; and (4) to determine an interpolation function for the coordinate differences that is continuous across the survey region. Optionally, the computer 69 also includes a data/command entry system 75, such as a keyboard or light pen or touch-based screen, and/or a visually perceptible or audibly perceptible display module 77.

Optionally, the display module 77 is arranged to display at least one of the following: (1) a selected number (K) of survey control locations that are closest to a selected location; (2) at least one transformation parameter that describes the transformation T; (3) the difference between at least one coordinate of the selected location in the first coordinate system and the corresponding coordinate of the image under T in the second coordinate system of the selected location; and (4) an estimate, using the interpolation function, of the difference between at least one coordinate of the selected location in the first coordinate system and the corresponding coordinate of the image under T in the second coordinate system of the selected location. Optionally, the computer 69 can be programmed so that a selected number (K) of survey control locations that is closest to the present location is automatically displayed, in one mode of computer operation.

As an example illustrating application of the invention, assume that a valuable object was buried or otherwise concealed, intentionally or unintentionally, at some time in the past, using a local (second) coordinate system to determine its location at that time. A user who wishes to retrieve the object at a later time may have access to the burial location coordinates in the second system. However, the user may not have access to coordinate difference values of the second coordinate system, relative to a first coordinate system that is now relied upon by the user. Alternatively, the user may only have access to coordinate differences between the first and second coordinate systems at widely spaced apart coordinate reconciliation locations, and the burial location may have second system coordinates that are far from any of these reconciliation locations. If a coordinate difference interpolation function is available that reconciles the corresponding coordinates of the first and second systems over the region of interest, the user may determine the location coordinates of the buried object in the first system for any reasonable burial location coordinates in the second system.

I claim:

1. A method for improving the accuracy of a survey of a region, the method comprising the step of providing a computer that is programmed to perform the following:

determining a grid of at least three survey reference points in a selected first coordinate system for a selected region;

providing a set of N survey control locations associated with the region;

for each grid point in the grid, identifying an associated survey control set of a selected number K (K≦N) of survey control locations that are associated with the grid point, and determining a transformation T that has at least one adjustable parameter and that maps location coordinates in the first coordinate system into location coordinates in a selected second coordinate system;

for each grid point in the grid, determining a coordinate difference between at least a first coordinate of the grid point and a corresponding coordinate of the image of the grid point under the transformation T;

determining a difference interpolation function, defined on and continuous at all points in the selected region, which is approximately equal to the coordinate difference for each point on the grid; and using the difference interpolation function to estimate and display a difference of at least one coordinate value between at least one selected survey location that is not among the K survey control locations in the first coordinate system and an image under the transformation T of the at least one selected survey location.

2. The method of claim 1, further comprising the step of determining said selected set of K survey control points to be said survey control points, each of whose distance to said grid point is no greater than the distance between said grid point and any survey control point that is not in said selected set of said K survey control points.

3. The method of claim 1, further comprising the step of choosing said at least one adjustable parameter so that a generalized sum of distances between each survey control location in said selected set of K survey control locations and the corresponding image under said transformation T, is minimized.

4. The method of claim 1, further comprising the steps of:

determining, for each said grid point in said grid, a second coordinate difference between at least a second coordinate of said grid point and a corresponding second coordinate of the image of said grid point under said transformation T; and determining a second difference interpolation function, defined on and continuous at all points in the selected region, which is substantially equal to the second coordinate difference for each point on the grid.

5. The method of claim 4, further comprising the steps of:

determining, for each said grid point in said grid, a third coordinate difference between at least a third coordinate of said grid point and a corresponding third coordinate of the image of said grid point under said transformation T; and determining a third difference interpolation function, defined on and continuous at all points in the selected region, which is substantially equal to the third coordinate difference for each point on the grid.

6. The method of claim 1, further comprising the step of selecting said first coordinate system and said second coordinate system to have a spatial dimension 2, with said location coordinates (x, y).

7. The method of claim 6, wherein said step of choosing said at least one adjustable parameter comprises the steps of:

obtaining a first set of K coordinate pairs $\{(x_k, y_k)\}$ (k=1 ..., K; K≧2) for said survey control locations in said first coordinate system and applying said transformation T to each coordinate pair in the first set to determine an image under T of the coordinate pair in said second coordinate system $$T(x_k, y_k)=(x'_k, y'_k);$$

choosing said at least one adjustable parameter for said transformation T so that an error sum $\epsilon_p$ defined by $$\varepsilon_p = \sum_{k=1}^{K} \{e_k|x'_k - x_k|^p + f_k|y'_k - y_k|^p\}$$

is minimized, where p is a selected positive number, and $e_k$ and $f_k$ are selected non-negative numbers, not all zero.

8. The method of claim 7, further comprising the step of choosing as said transformation T the linear transformation defined by $$x'=h_{11}x+h_{12}y+h_{13},$$

$$y'=h_{21}x+h_{22}y+h_{23},$$

where at least one of the coefficients $h_{ij}$ (i=1,2; j=1,2,3) is an adjustable parameter.

9. The method of claim 8, wherein said step of choosing said at least one adjustable parameter further comprises the step of selecting at least one of said adjustable coefficients $h_{ij}$ to minimize said error sum $\epsilon_p$.

10. The method of claim 7, further comprising the step of choosing as said transformation T the transformation defined by (1) a rotation of the first coordinate system around a selected rotation axis by a selected angle θ1, (2) multiplication of said coordinates resulting from the rotation by a selected real number scale factor L, and (3) translation of the resulting first and second location coordinates by selected translation distances Δx and Δy, respectively, where at least one of the coefficients θ1, L, Δx and Δy is an adjustable parameter.

11. The method of claim 7, further comprising the step of selecting said positive number p to be equal to 2 and choosing, each of said non-negative numbers $e_k$ and $f_k$ to be equal to a selected positive number.

12. The method of claim 1, further comprising the step of selecting said first coordinate system and said second coordinate system to have a spatial dimension 3, with said location coordinates (x, y, z).

13. The method of claim 12, wherein said step of choosing, said at least one adjustable parameter comprises the steps of:

obtaining a first set of K coordinate triples $\{(x_k, y_k, z_k)\}$ (k=1, ..., K; K≧2) for said survey control locations in said first coordinate system and applying said transformation T to each coordinate triple in the first set to determine an image under T of the coordinate triple in said second coordinate system $$T(x_k, y_k, z_k)=(x'_k, y'_k, z'_k);$$

choosing said at least one adjustable parameter for said transformation T so that an error sum $\epsilon_p$ defined by $$\varepsilon_p = \sum_{k=1}^{K} \{e_k|x'_k - x_k|^p + f_k|y'_k - y_k|^p + g_k|z'_k - z_k|^p\}$$

is minimized, where p is a selected positive number and $e_k$, $f_k$ and $g_k$ are selected non-negative numbers, not all zero.

14. The method of claim 13, further comprising the step of choosing as said transformation T the linear transformation defined by $$x'=h_{11}x+h_{12}y+h_{13}z+h_{14},$$

$$y'=h_{21}x+h_{22}y+h_{23}z+h_{24},$$

$$z'=h_{31}x+h_{32}y+h_{33}z+h_{34},$$

where at least one of the coefficients $h_{ij}$ (i=1,2,3; j=1,2,3,4) is an adjustable parameter.

15. The method of claim 14, wherein said step of choosing said at least one adjustable parameter further comprises the step of selecting at least one of said adjustable coefficients $h_{ij}$ to minimize said error sum $\epsilon_p$.

16. The method of claim 13, further comprising the step of choosing as said transformation T the transformation defined by (1) a first rotation of the first coordinate system around a selected first rotation axis by a selected first angle θ1, (2) a second rotation of the first coordinate system around a selected second rotation axis, which differs from the selected first rotation axis, by a selected second angle θ2, (3) a third rotation of the first coordinate system around a selected third rotation axis, which differs from the selected second rotation axis, by a selected second angle θ3, (4) multiplication of said coordinates resulting from the first, second and third rotations by a selected real number scale factor L, and (5) translation of the resulting first, second and third location coordinates by selected translation distances Δx, Δy and Δz, respectively, where at least one of the coefficients θ1, θ2, θ3, L, Δx, Δy and Δz is an adjustable parameter.

17. The method of claim 13, further comprising the step of selecting said positive number p to be equal to 2 and choosing each of said non-negative numbers $e_k$, $f_k$ and $g_k$ to be equal to a selected positive number.

18. Apparatus for transforming coordinates for at least one location, surveyed in a first coordinate system, into location coordinates in a second coordinate system, the apparatus comprising a computer that is programmed to:

obtain location coordinates for a selected set of survey control locations (K≧2) in a first coordinate system, and to obtain a subset of K selected survey control locations (K≧2) that are closer to a selected location than any other survey control location in the selected set;

obtain location coordinates for the set of survey control locations, expressed in a selected second coordinate system;

determine a coordinate transformation T, having at least one adjustable parameter, of the first coordinate system onto the second coordinate system to minimize a selected generalized sum of distances between each survey control location in the selected subset of K survey control locations and the corresponding image under the transformation T, by choice of at least one adjustable parameter;

determine an interpolation function that estimates the difference between at least one coordinate of a selected location in the first coordinate system and the corresponding coordinate of the image under T of the selected location; and use the difference interpolation function to estimate and display a difference of at least one coordinate value between at least one of the N survey control locations in the first coordinate system and an image under the transformation T of the at least one of the N survey control locations.

19. The apparatus of claim 18, wherein said computer applies said transformation T to said coordinates of at least one location in said first coordinate system that is not a survey control location.

20. The apparatus of claim 19, wherein said computer is programmed to determine said transformation T at approximately a time that a location is determined for said at least one location that is not a survey control location in said first coordinate system.

21. The apparatus of claim 20, wherein said computer is handheld.

22. The apparatus of claim 18, further comprising a location determination (LD) system that receives LD signals from a plurality of LD signal sources and that provides present location information for said computer from which said computer determines said coordinates for each of said plurality of survey control locations in at least one of said first coordinate system and said second coordinate system.

23. The apparatus of claim 18, further comprising a display that, in a selected mode of operation, automatically displays, in at least one of visually perceptible and audibly perceptible form, a selected number of survey control locations that are closest to said present location of said LD system.

24. The apparatus of claim 22, wherein said LD signals are drawn from a class of timed signals consisting of Global Positioning System signals, Global Orbiting Navigational Satellite System signals and Low Earth Orbit system signals.

25. The apparatus of claim 18, further comprising a display that displays, in at least one of visually perceptible and audibly perceptible form, at least one of (1) a selected number of survey control locations that are closest to a selected location; (2) at least one transformation parameter that describes said transformation T; (3) said difference between said at least one coordinate of said selected location in said first coordinate system and said corresponding coordinate of said image under T of said selected location; and (4) an estimate, using said interpolation function, of said difference between said at least one coordinate of said selected location in said first coordinate system and said corresponding coordinate of said image under T of said selected location.

* * * * *